(12) United States Patent
Chen et al.

(10) Patent No.: US 7,623,424 B2
(45) Date of Patent: Nov. 24, 2009

(54) APPARATUS FOR IDENTIFYING ADDRESS IN PREGROOVE OF BLUE-RAY DISC

(75) Inventors: Chun-Nan Chen, Taipei (TW); Wen-Yi Wu, Chu Pei (TW); Pi-Hai Liu, Taipei (TW)

(73) Assignee: Media Tek Inc., Hsin-Chu (TW)

( * ) Notice: Subject to any disclaimer, the term of this patent is extended or adjusted under 35 U.S.C. 154(b) by 737 days.

(21) Appl. No.: 11/042,082

(22) Filed: Jan. 26, 2005

(65) Prior Publication Data
US 2005/0232104 A1 Oct. 20, 2005

(30) Foreign Application Priority Data
Apr. 16, 2004 (TW) .............................. 93110780 A (51) Int. Cl.
G11B 7/00 (2006.01)
(52) U.S. Cl. .................................................. 369/47.27

(58) Field of Classification Search ....................... None
See application file for complete search history.

(56) References Cited

U.S. PATENT DOCUMENTS 7,099,244 B2 * 8/2006 Nakata et al. ............ 369/47.19
7,190,655 B2 * 3/2007 Kobayashi .................. 369/100

* cited by examiner

*Primary Examiner*—Joseph H Feild
*Assistant Examiner*—Joseph Haley
(74) *Attorney, Agent, or Firm*—Birch, Stewart, Kolasch & Birch, LLP (57) ABSTRACT

An apparatus for identifying the address in pregroove (ADIP) of a Blu-ray disc is described. The apparatus uses a statistical scheme or distance-finding scheme to find the position of a predetermined minimum shift keying (MSK) mark or the first MSK mark, i.e. a bit sync unit, from an ADIP unit to identify data of the ADIP unit. The present invention doesn't have the error propagation effect occurring in the prior art so that the error rate for ADIP identification can be greatly reduced.

6 Claims, 13 Drawing Sheets

| MSK position | number of times in an ADIP word | |
|---|---|---|
| n | 83 | bit sync |
| (n+12) mod 56 | k(k<=60) | data "0" |
| (n+14) mod 56 | 60-k | data "1" |
| (n+16) mod 56 | 1 | sync 0~3 |
| (n+18) mod 56 | 1 | |
| (n+20) mod 56 | 1 | |
| (n+22) mod 56 | 1 | |
| (n+26) mod 56 | 1 | |
| (n+28) mod 56 | 1 | |
| (n+30) mod 56 | 1 | |
| (n+32) mod 56 | 1 | |

| previous distance | current distance | description for case of current MSK mark being a bit sync unit |
|---|---|---|
| 10 | 24~30 | the previous ADIP unit is one of sync 0-3 unit |
| 24~44 | 56 | the previous ADIP unit is isolated unit |
| 12~14 | 42~44 | the previous ADIP unit is a data unit |

FIG. 7B

| previous distance | current distance | description for case of current MSK mark not being a bit sync unit |
|---|---|---|
| 56 | 16~22 | the current MSK mark is the second MSK mark of sync 0-3 units |
| 16~22 | 10 | the current MSK mark is the third MSK mark of sync 0-3 units |
| 42~56 | 12~14 | the current MSK mark is the second MSK mark of data unit |

APPARATUS FOR IDENTIFYING ADDRESS IN PREGROOVE OF BLUE-RAY DISC

BACKGROUND OF THE INVENTION

1. Field of the Invention

The present invention is related to an apparatus for identifying the address in a pregroove (ADIP) of a Blu-ray disc, and more particularly, to an apparatus that uses a statistical scheme or distance-finding scheme to determine the position of a predetermined minimum shift keying (MSK) mark in an ADIP unit to identify data of the ADIP unit.

2. Description of Related Art

Conventionally, optical discs, such as digital versatile disc (DVD) and video compact disc (VCD), are extensively applied for business activities or family life. They are mainly used to record bulk data, e.g. movie, music or application software. Recently, in order to increase the storage capacity, a standard for Blu-ray disc was issued to fulfill the requirements of consumers. A Blu-ray disc has more than five times the capacity of DVD.

Figure 1A:
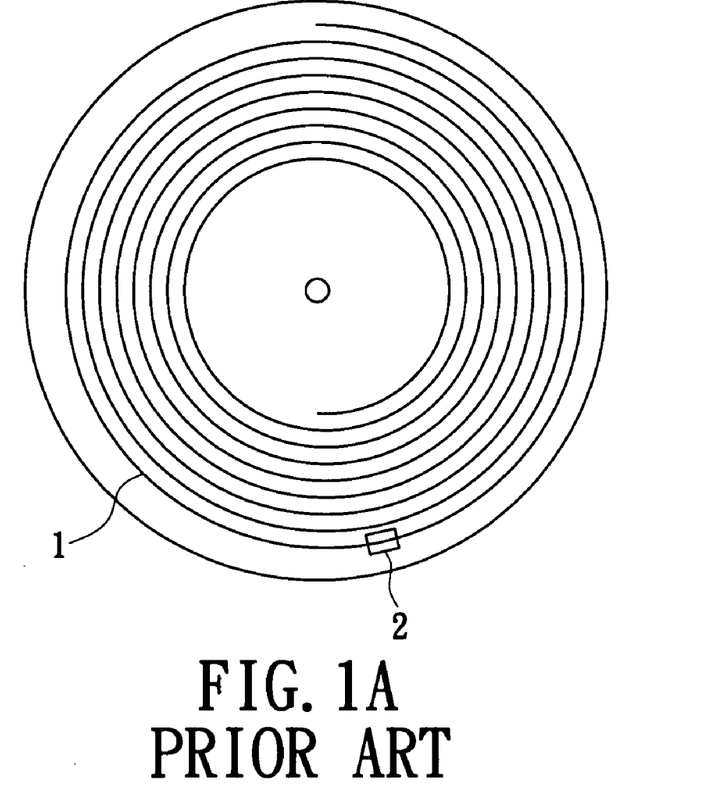
FIG. 1A is a schematic diagram of a conventional optical disc.
Figure 1B:
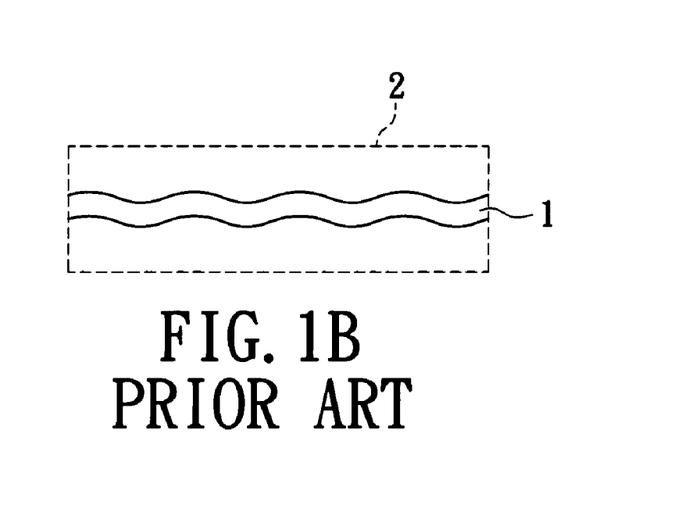

Reference is made to FIG. 1A, which is a schematic diagram of a conventional optical disc. Generally, in the manufacture process, a spiral pregroove 1 is disposed on the optical disc to define the physical address for data recording. In FIG. 1.B, a portion 2 of the pregroove 1 is magnified. As shown in the figure, the pregroove 1 has a wobble with a specific phase or frequency to define the physical address.

In accordance with the standard of Blu-ray disc, the pregroove has multiple ADIP units with MSK marks and the relative positions of the MSK marks can be used to identify the data in the ADIP units. Thereby, an optical disc drive can determine the physical address of the Blu-ray disc and perform a reading or writing process.

Figure 2:
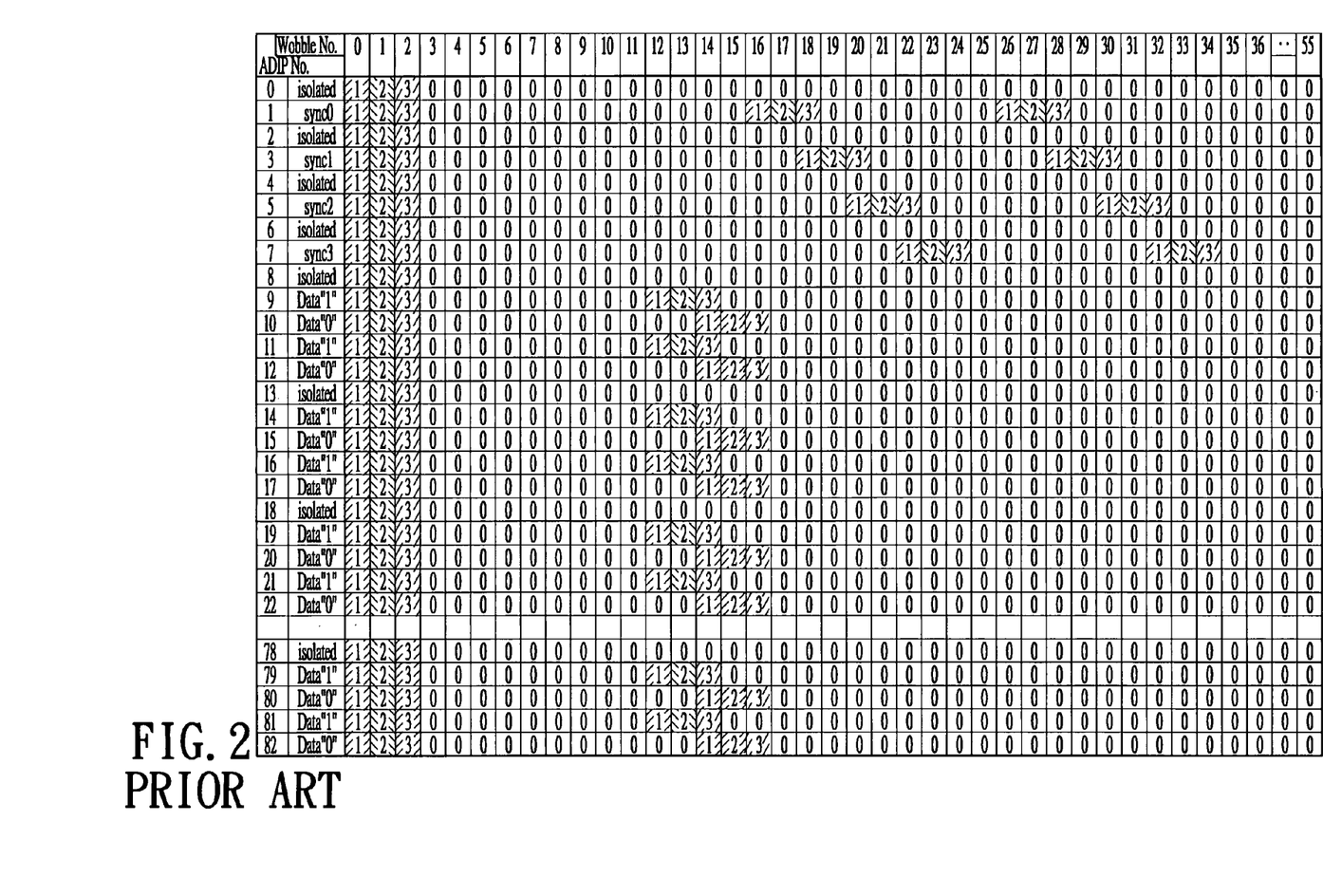
FIG. 2 is a schematic diagram of an ADIP word in the Blu-ray disc.

Reference is made to FIG. 2, which is a schematic diagram of an ADIP word in the Blu-ray disc. As shown in the figure, the ADIP word has 83 ADIP units, which are designated as ADIP No. 0-82. Each of the ADIP unit has 56 nominal wobble length (NWL) units, which are designated as Wobble Nos. 0-55. The ADIP word has a word sync unit formed by ADIP No. 1, 3, 5, 7 and each of the ADIP unit has a bit sync unit formed by Wobble No. 0-2.

There are four kinds of wobble structures, designated as "0-3", for defining the content of the NWL units. The NWL units designated as "0" have a monotone wobble and every three consecutive NWL units designated as "1-3" form an MSK wobble, i.e. an MSK mark.

Figure 3:
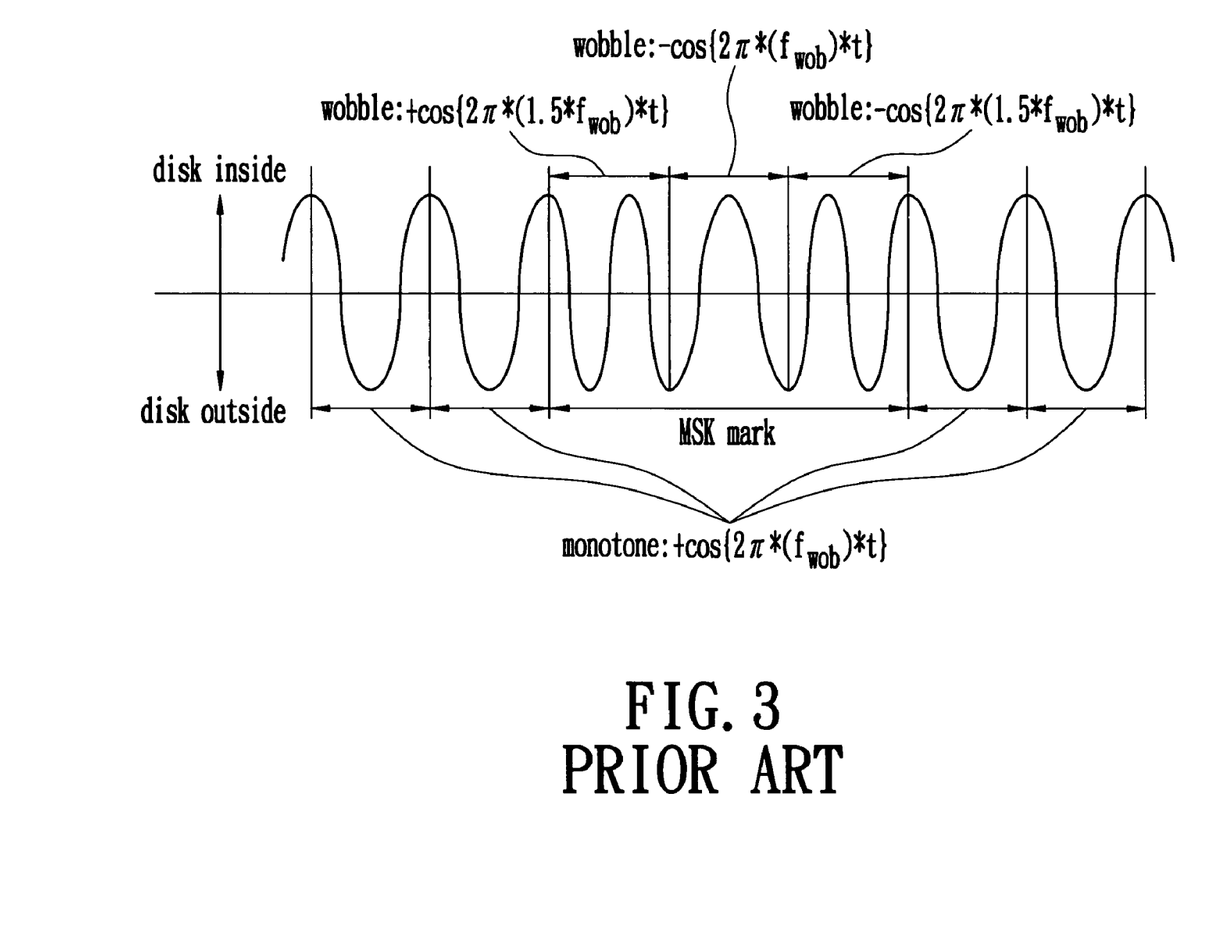
FIG. 3 is a schematic diagram of NWL units in accordance with the Blu-ray disc standard.

Reference is made to FIG. 3, which is a schematic diagram of NWL units in accordance with the Blu-ray disc standard. The NWL units designated as "0" have a wobble frequency $f_{wod}$ and a wobble waveform $\cos(2\pi*f_{wod}*t)$. The MSK mark includes three consecutive NWL units, designated as "1-3", which respectively have wobble frequencies $1.5*f_{wod}$, $f_{wod}$ and $1.5*f_{wod}$ and wobble waveforms $\cos(2\pi*(1.5*f_{wod})*t)$, $-\cos(2\pi*f_{wod}*t)$ and $-\cos(2\pi*(1.5*f_{wod})*t)$.

Reference is made again to FIG. 2. The ADIP word has seven kinds of ADIP units, including isolated, sync0, sync1, sync2, sync3, data"0" and data"1" units. The isolated unit only has an MSK mark; the sync "0-1" units have three MSK marks; and the data"0-1" units have two MSK marks.

It should be noticed that the spacing between any two consecutive MSK marks is specific. For example, the spacing having ten NWLs between two consecutive MSK marks only appears in the word sync units, i.e. ADIP No. 1, 3, 5, 7; the spacing having twelve NWLs between two consecutive MSK marks only appears in the data"1" units; and the spacing having fourteen NWLs between two consecutive MSK marks only appears in the data"0" units.

According to this property, the prior art uses the relative positions of the MSK marks to identify the data in the ADIP units. The conventional optical disc drive can determine the physical address and perform a reading or writing process.

However, once a position determination error occurs, the conventional optical disc drive will erroneously determine the spacing between the present and the previous MSK marks and the spacing between the present and the following MSK marks. In other words, the prior art has an error propagation effect and that increases the error probability for data identification of ADIP units.

Accordingly, as discussed above, the prior art still has some drawbacks that could be improved. The present invention aims to resolve the drawbacks in the prior art.

SUMMARY OF THE INVENTION

An objective of the present invention is to provide an ADIP identification apparatus that uses a statistic scheme or distance-finding scheme to find the position of a predetermined MSK mark or the first MSK mark, i.e. the bit sync unit, from an ADIP unit to identify data of the ADIP unit. The present invention doesn't have the error propagation effect occurring in the prior art, so the error rate for ADIP identification can be greatly reduced.

For reaching the objective above, the present invention provides an apparatus for identification of ADIP units. It includes: an MSK mark identifier to identify MSK marks of the ADIP units according to an estimation window and output MSK indication signals accordingly; an NWL number indicator to designate positions of the MSK marks according to the MSK indication signals and perform a position synchronization process according to an NWL sync signal; an MSK position statistic analyzer to count the MSK marks occurring at the same positions to find a predetermined MSK mark and output the NWL sync signal accordingly; and an ADIP unit decoder to identify the ADIP units according to the positions of the MSK marks.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 1.B is a partially magnified diagram of the conventional optical disc.

DETAILED DESCRIPTION OF PREFERRED EMBODIMENTS

Figure 4A:
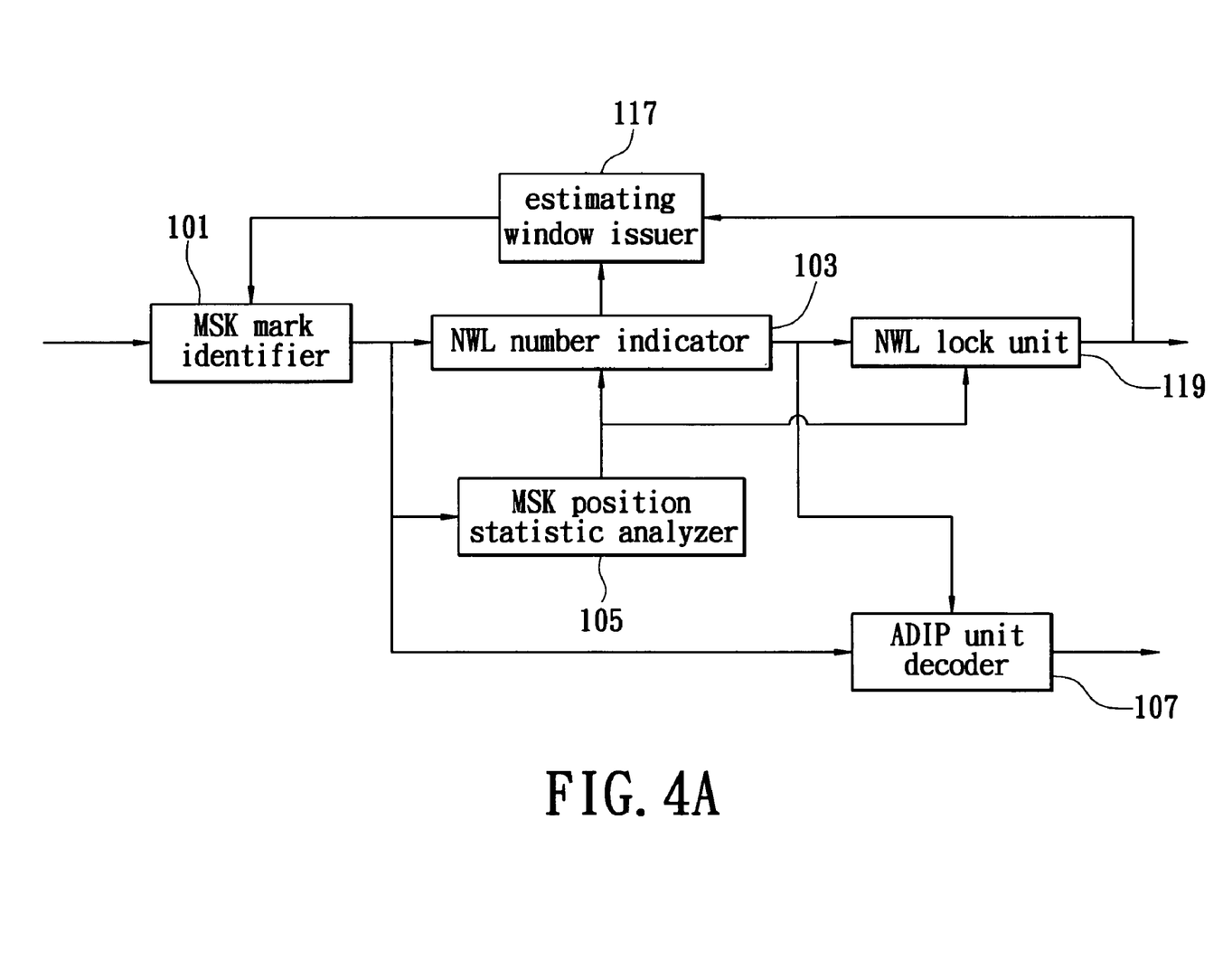
FIG. 4A is a block diagram of the first preferred embodiment in accordance with the present invention.

Reference is made to FIG. 4A, which is a block diagram of the first preferred embodiment in accordance with the present invention. The present invention provides an ADIP identification apparatus for identifying data of ADIP units on an optical disc according to the received signals. As shown in the figure, the present invention includes an MSK mark identifier 101, an NWL number indicator 103, an MSK position statistic analyzer 105, an ADIP unit decoder 107, an estimating window issuer 117 and an NWL lock unit 119.

The MSK mark identifier 101 is used to identify the MSK marks of the ADIP units within the range of an estimating window. Every time MSK mark identifier 101 finds an MSK mark, it sends an MSK indication signal to the NWL number indicator 103, MSK position statistic analyzer 105 and ADIP unit decoder 107.

The MSK position statistic analyzer 105 keeps receiving the MSK indication signals and counting the MSK indication signals occurring at the same positions. The MSK position statistic analyzer 105 can find out the position of the bit sync unit, i.e. the position of the first MSK mark in the ADIP unit, and send an NWL sync signal to the NWL number indicator 103 correspondingly.

Figure 4B:
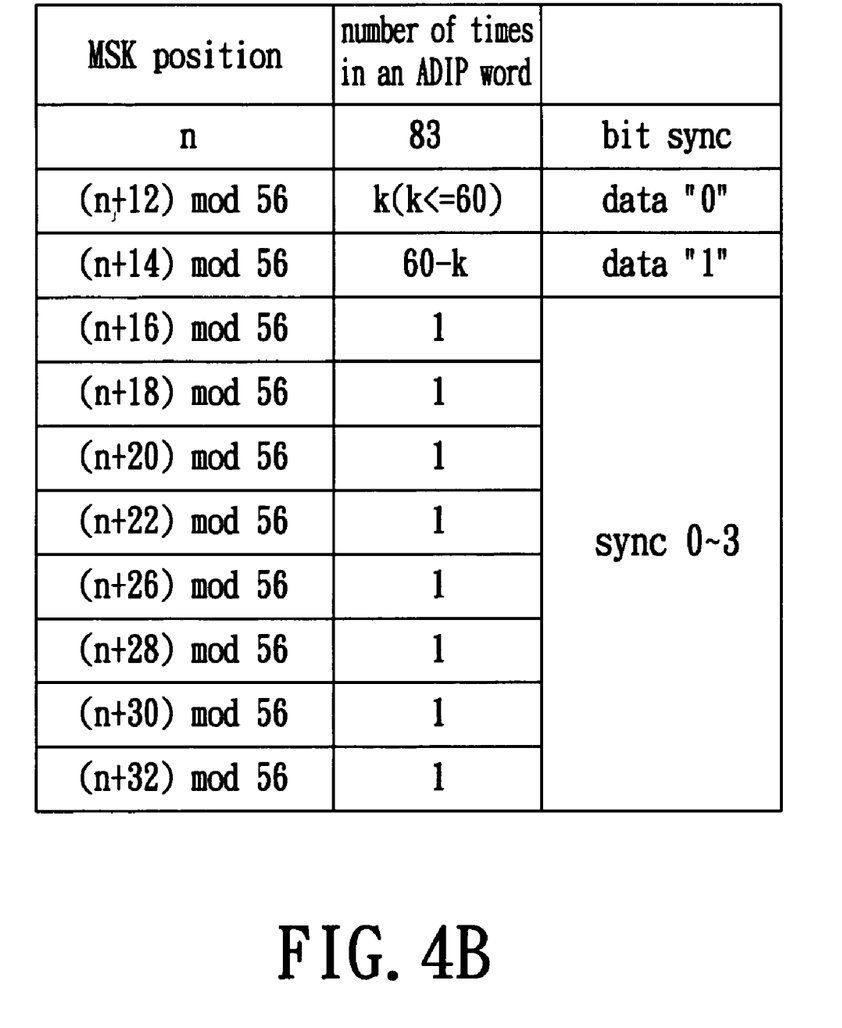
FIG. 4B is a table showing the relative positions of the MSK marks.

Reference is made to FIG. 4B, which is a table showing the relative positions of the MSK marks. As shown in the figure, if the bit sync unit is located at Wobble No. n, the data"0" unit is located at Wobble No. (n+12)mod56, the data"1" unit is located at Wobble No. (n+14)mod56 and so on.

In an ADIP word, since every ADIP unit has a bit sync unit at its front end, there are 83 MSK marks located at Wobble No. n. Furthermore, since each ADIP word has a total of 60 data units, the number of the data"1" units must be 60-k if the number of the data "0" units is k. In addition, except for the bit sync unit in the front end, each of the sync0-3 units still has two MSK marks. Each of the MSK marks in the sync0-3 units is located in a distinct position. These MSK marks are respectively located at Wobble No. (n+m)mod56, m=16, 18, 20, 22, 26, 28, 30, 32.

Since the bit sync units are all fixedly located at Wobble No. n and appear 83 times in a ADIP word, the MSK position statistic analyzer 105 can use this property to find out the position of the bit sync units and send an NWL sync signal to the NWL number indicator 103 correspondingly.

Then, the NWL number indicator 103 performs a position synchronization process according to the NWL sync signal. During the process, the NWL number indicator 103 can change or maintain the designation for the position of the bit sync unit. In other words, the NWL number indicator 103 can change the position designation of the first NWL units in the bit sync units to Wobble No. 0 or maintain it. Then, based on the position designation of the bit sync unit, the NWL number indicator 103 can designate the positions of the following MSK marks according to the MSK indication signals.

The ADIP unit decoder 107 is used to identify the data of the ADIP units according to the MSK indication signal received from the MSK mark identifier 101 and the position designations of the MSK marks assigned by the NWL number indicator 103.

The NWL lock unit 119 is used to declare an NWL lock status according to the position designations of the MSK marks provided by the NWL number indicator 103 and the NWL sync signal sent from the MSK position statistic analyzer 105. In other words, after the NWL sync signal is received, the NWL lock unit 119 compares it with the position designations of the MSK marks provided by the NWL number indicator 103. If they match, the NWL lock unit 119 declares an NWL lock status. Otherwise, the NWL lock unit 119 declares an NWL unlock status.

The estimating window issuer 117 is used to set an estimating window according to the status declared by the NWL lock unit 119 and the designations of the MSK marks provided by the NWL number indicator 103. By using the position information provided by the NWL number indicator 103, the estimating window issuer 117 can know that the MSK marks have odd or even designation numbers. Since all the designation numbers for the MSK marks must be odd or even at the same time, the system of the present invention can determine that the following MSK marks must appear at the position with odd or even designation numbers after the NWL lock status is declared.

Therefore, when the NWL lock status is declared, the estimating window issuer 117 can set an estimating window to make the MSK mark identifier 101 only detect the positions with odd or even designation numbers according to the position information provided by the NWL number indicator 103. The error probability for MSK detection is reduced.

Figure 5:
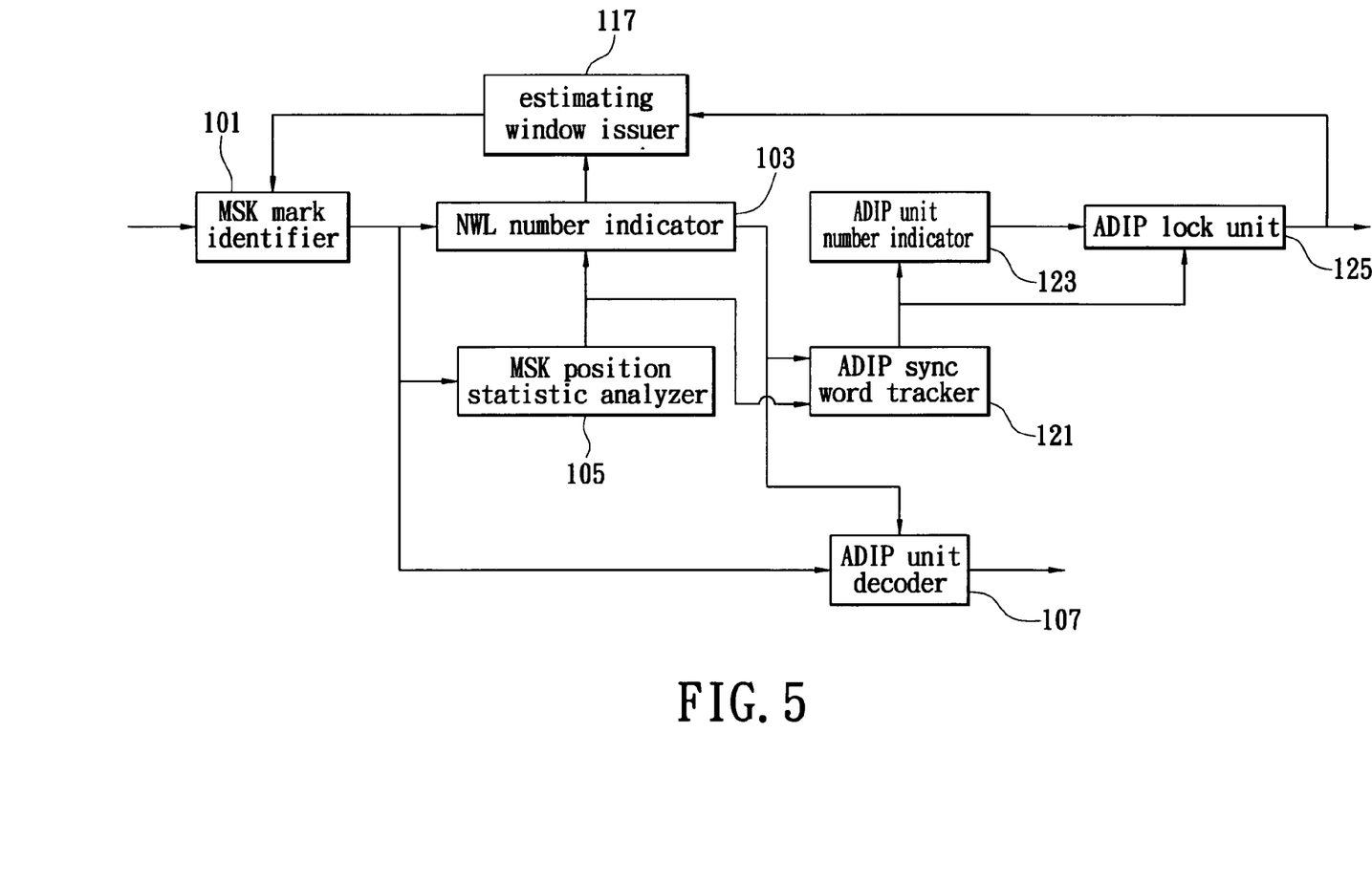
FIG. 5 is a block diagram of the second preferred embodiment in accordance with the present invention.

Reference is made to FIG. 5, which is a block diagram of the second preferred embodiment in accordance with the present invention. As shown in the figure, some components of the second embodiment are the same as that of the first embodiment, which include the MSK mark identifier 101, the NWL number indicator 103, the MSK position statistic analyzer 105, the ADIP unit decoder 107 and the estimating window issuer 117.

The difference between the first and second embodiments is that the second embodiment doesn't have the NWL lock unit 119 but further has an ADIP sync word tracker 121, an ADIP unit number indicator 123 and an ADIP lock unit 125.

The ADIP sync word tracker 121 is used to track the word sync unit to output an ADIP unit synchronization signal. The ADIP sync word tracker 121 tracks the word sync unit according to the MSK position information provided by the NWL number indicator 103 and the NWL sync signal sent from the MSK position statistic analyzer 105. The ADIP sync word tracker 121 can output the ADIP unit synchronization signal for the ADIP unit number indicator 123.

The ADIP unit number indicator 123 is used to designate the positions of the ADIP units in an ADIP word and perform an ADIP unit synchronization process according to the ADIP unit synchronization signal. Additionally, the ADIP lock unit 125 is used to declare an ADIP unit lock status according to the position information of ADIP units sent from the ADIP unit number indicator 123 and the ADIP unit synchronization signal.

Figure 6:
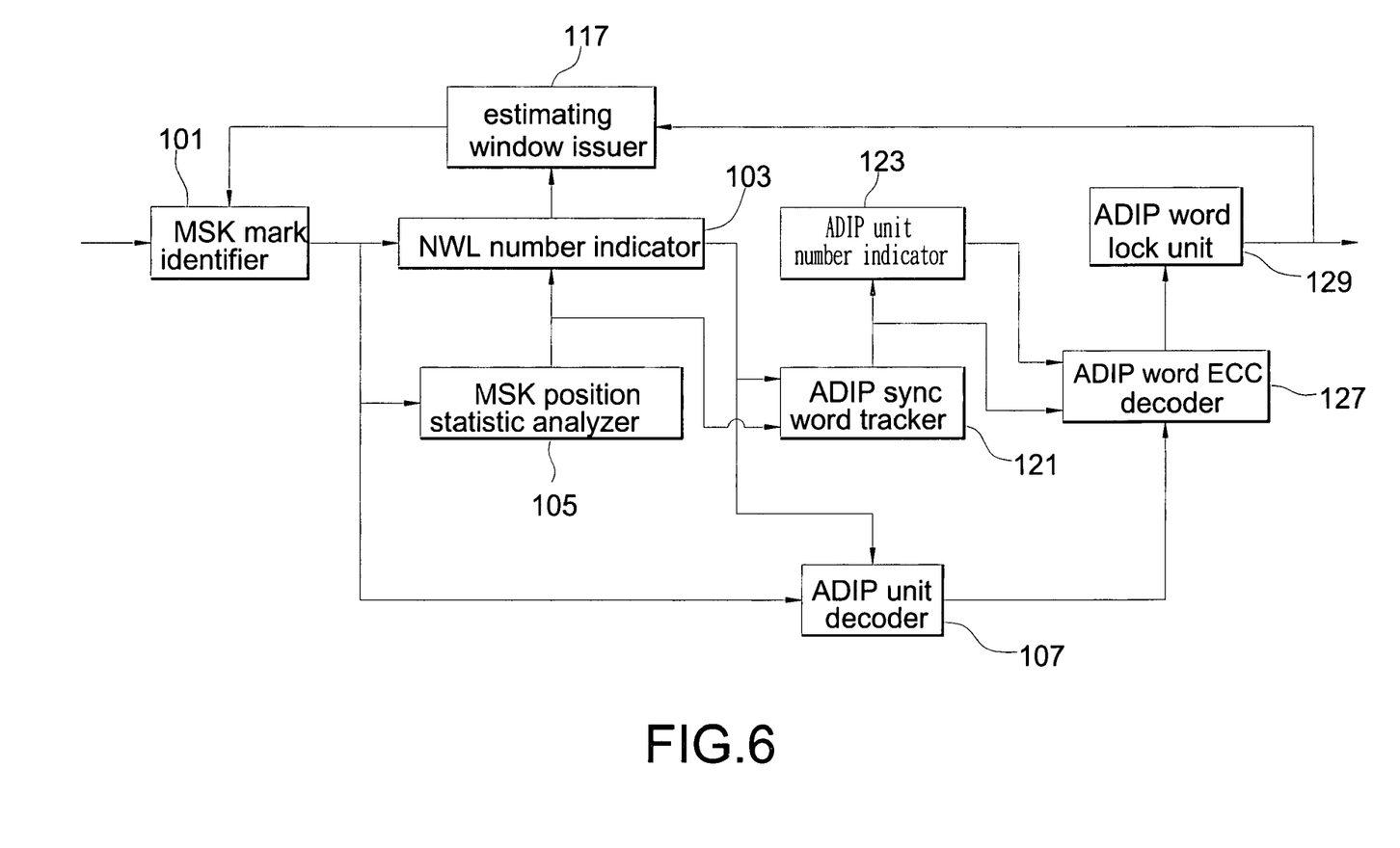
FIG. 6 is a block diagram of the third preferred embodiment in accordance with the present invention.

Reference is made to FIG. 6, which is a block diagram of the third preferred embodiment in accordance with the present invention. As shown in the figure, some components of the third embodiment are the same as that of the second embodiment, which include the MSK mark identifier 101, the NWL number indicator 103, the MSK position statistic analyzer 105, the ADIP unit decoder 107, the estimating window issuer 117, the ADIP sync word tracker 121 and the ADIP unit number indicator 123.

The difference between the second and third embodiments is that the third embodiment doesn't have the ADIP lock unit 125 but further has an ADIP word error correction code (ECC) decoder 127 and an ADIP word lock unit 129. The ADIP word ECC decoder 127 is used to decode ADIP words. After successfully decoding an ADIP word, the ADIP word ECC decoder 127 sends a success flag signal to the ADIP word lock unit 129. Additionally, the ADIP word lock unit 129 is used to declare an ADIP word lock status according to the success flag signal.

Figure 7A:
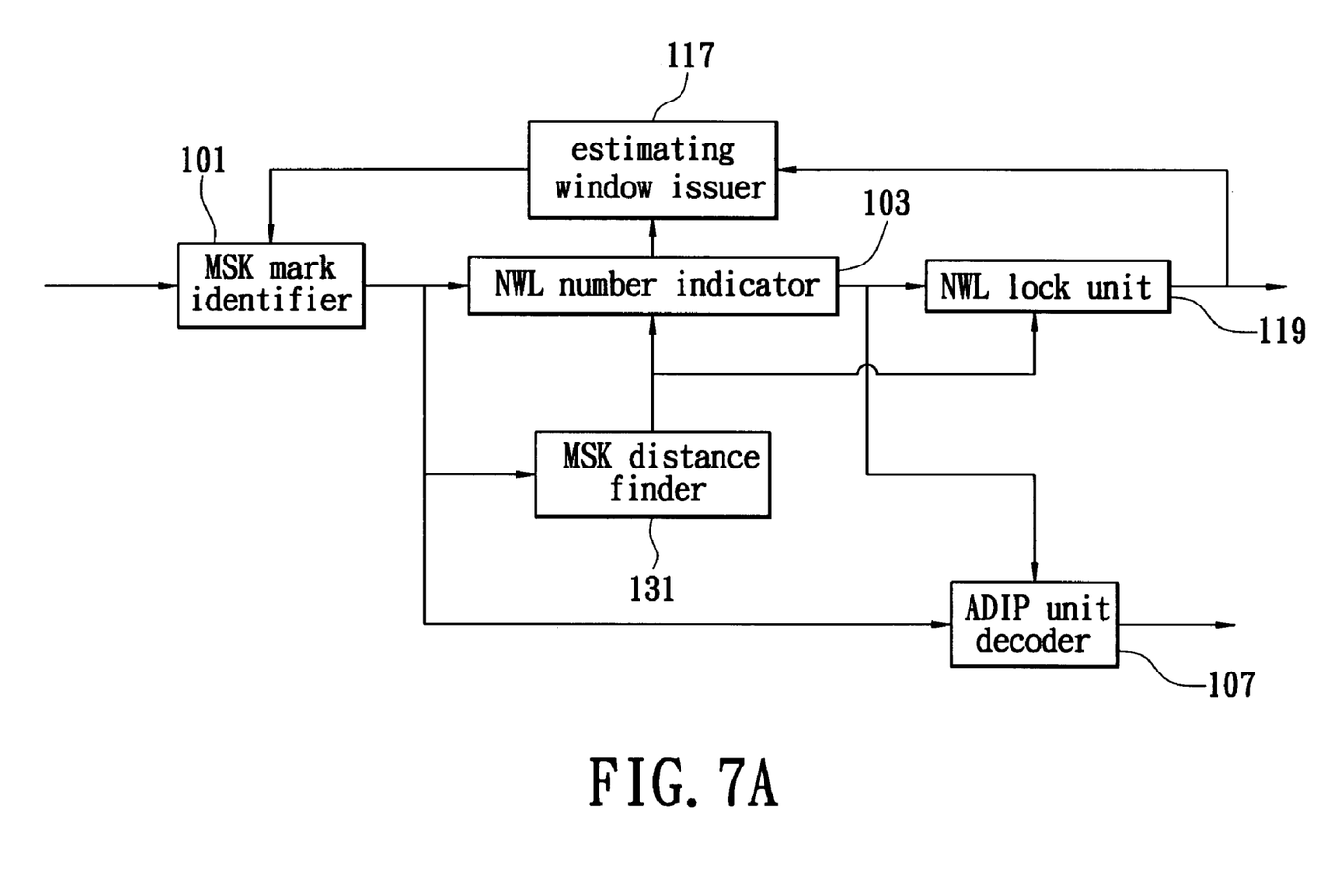
FIG. 7A is a block diagram of the fourth preferred embodiment in accordance with the present invention.

Reference is made to FIG. 7A, which is a block diagram of the fourth preferred embodiment in accordance with the present invention. As shown in the figure, some components of the fourth embodiment are the same as that of the first embodiment, which include the MSK mark identifier 101, the NWL number indicator 103, the ADIP unit decoder 107, the estimating window issuer 117 and the NWL lock unit 119.

The difference between the first and fourth embodiments is that the fourth embodiment replaces the MSK position statistic analyzer 105 with an MSK distance finder 131. The MSK distance finder 131 can find the positions of the bit sync units according to the spacing distances between the MSK marks and outputs the NWL sync signal.

Figure 7B:
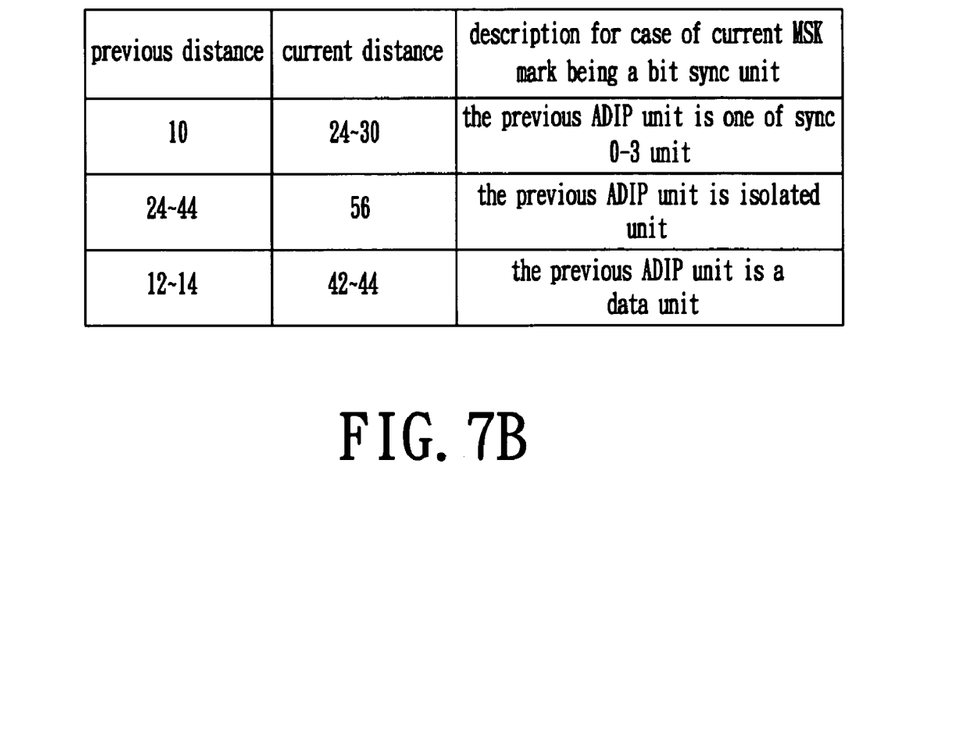
FIG. 7B shows the previous and current distances for the MSK marks that are bit sync units.
Figure 7C:
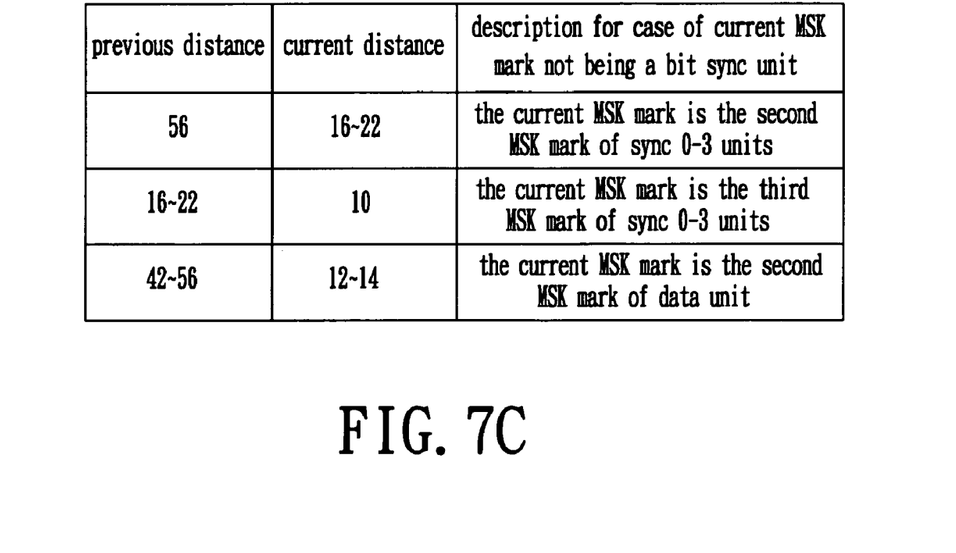
FIG. 7C shows the previous and current distances for the MSK marks that are not the bit sync units.

Reference is made to FIGS. 7B and 7A. FIG. 7B shows the previous and current distances for the MSK marks that are bit sync units and FIG. 7C shows the same for the MSK marks that are not the bit sync units. It should be noted that the previous distance refers to the spacing distance between the two consecutive MSK marks previous to the current MSK marks and the current distance refers to the spacing distance between the previous adjacent MSK mark to the current MSK mark and the current MSK mark.

As shown in FIG. 7B, in the case of the current MSK mark being a bit sync unit, if the bit sync unit is located behind sync 0-3 units, its current distance is 10 NWL units and its current distance is 24-30 NWL units; if the bit sync unit is located behind isolated units, its current distance is 24-44 NWL units and its current distance is 56 NWL units; and if the bit sync unit is located behind data"0-1" units, its current distance is 12-14 NWL units and its current distance is 42-44 NWL units. As shown in FIG. 7C, in the case of the current MSK mark not being a bit sync unit, if the bit sync unit is the second MSK marks of sync 0-3 units, its current distance is 56 NWL units and its current distance is 16-22 NWL units; if the bit sync unit is the third MSK marks of sync 0-3 units, its current distance is 16-22 NWL units and its current distance is 10 NWL units; and if the bit sync unit is the second MSK marks of data"0-1" units, its current distance is 42-56 NWL units and its current distance is 12-14 NWL units.

In accordance with the tables shown in FIGS. 7B and 7C, the current distance must be larger than 23 NWL units in the case of the current MSK mark being a bit sync unit and smaller than 23 NWL units in the case of the current MSK mark not being a bit sync unit. Hence, MSK distance finder 131 can set the threshold of current distance as 23 NWL units to determine whether the current MSK mark is a bit sync unit or not.

Furthermore, the current distance must be larger than the previous distance in the case of the current MSK mark being a bit sync unit and smaller than the previous distance in the case of the current MSK mark not being a bit sync unit. Hence, MSK distance finder 131 can also compare the current and previous distances to determine whether the current MSK mark is a bit sync unit or not.

Figure 8:
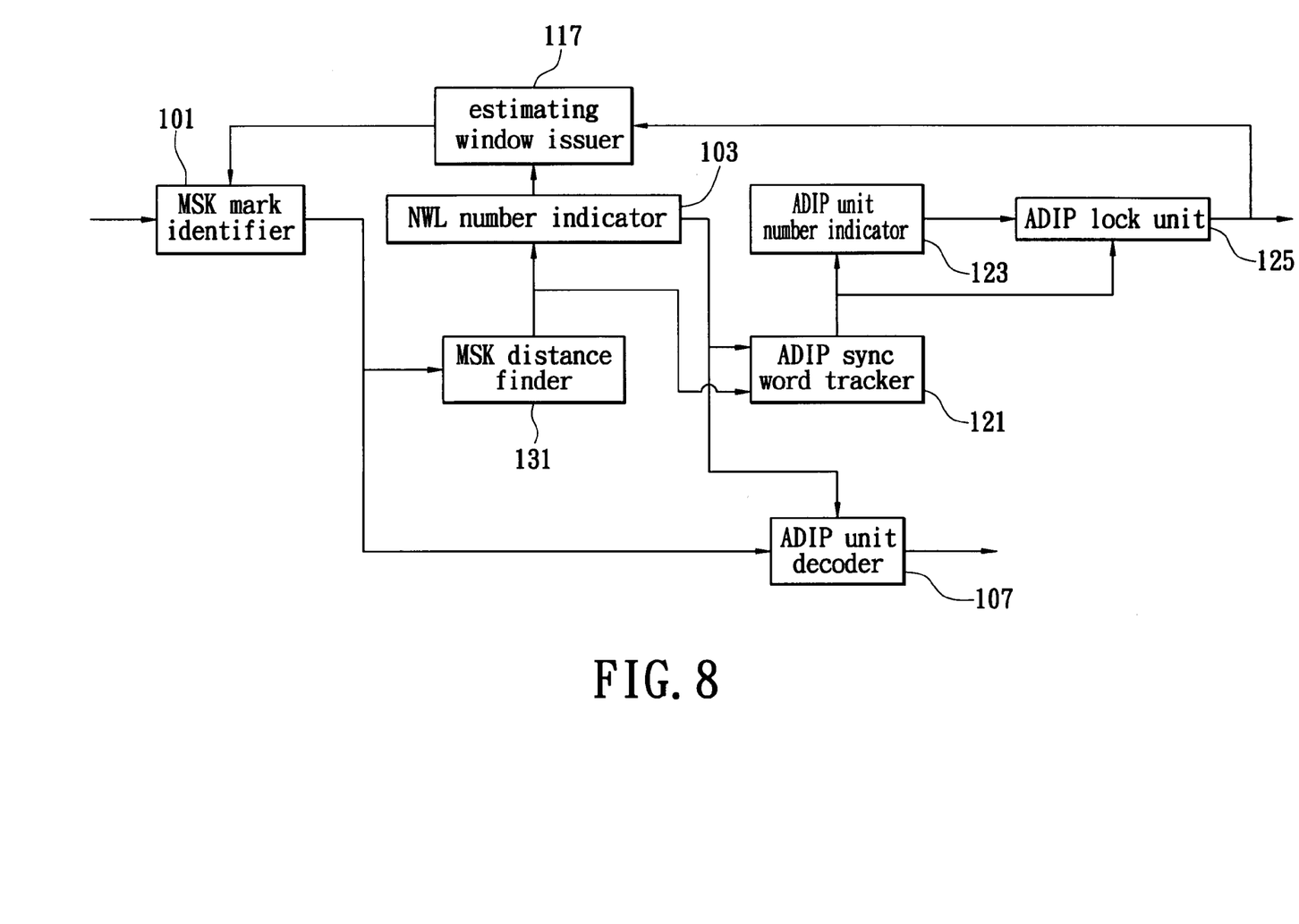
FIG. 8 is a block diagram of the fifth preferred embodiment in accordance with the present invention.

Reference is made to FIG. 8, which is a block diagram of the fifth preferred embodiment in accordance with the present invention. As shown in the figure, some components of the fifth embodiment are the same as that of the fourth embodiment, which include the MSK mark identifier 101, the NWL number indicator 103, the MSK distance finder 131, the ADIP unit decoder 107 and the estimating window issuer 117.

The difference between the fourth and fifth embodiments is that the fifth embodiment doesn't have the NWL lock unit 119 but further has the ADIP sync word tracker 121, the ADIP unit number indicator 123 and the ADIP lock unit 125.

As described above, the ADIP sync word tracker 121 is used to track the word sync unit to output an ADIP unit synchronization signal. The ADIP sync word tracker 121 tracks the word sync unit according to the MSK position information provided by the NWL number indicator 103 and the NWL sync signal sent from the MSK distance finder 131. The ADIP sync word tracker 121 can output the ADIP unit synchronization signal for the ADIP unit number indicator 123.

The ADIP unit number indicator 123 is used to designate the positions of the ADIP units in an ADIP word and perform an ADIP unit synchronization process according to the ADIP unit synchronization signal. Additionally, the ADIP lock unit 125 is used to declare an ADIP unit lock status according to the position information of ADIP units sent from the ADIP unit number indicator 123 and the ADIP unit synchronization signal.

Figure 9:
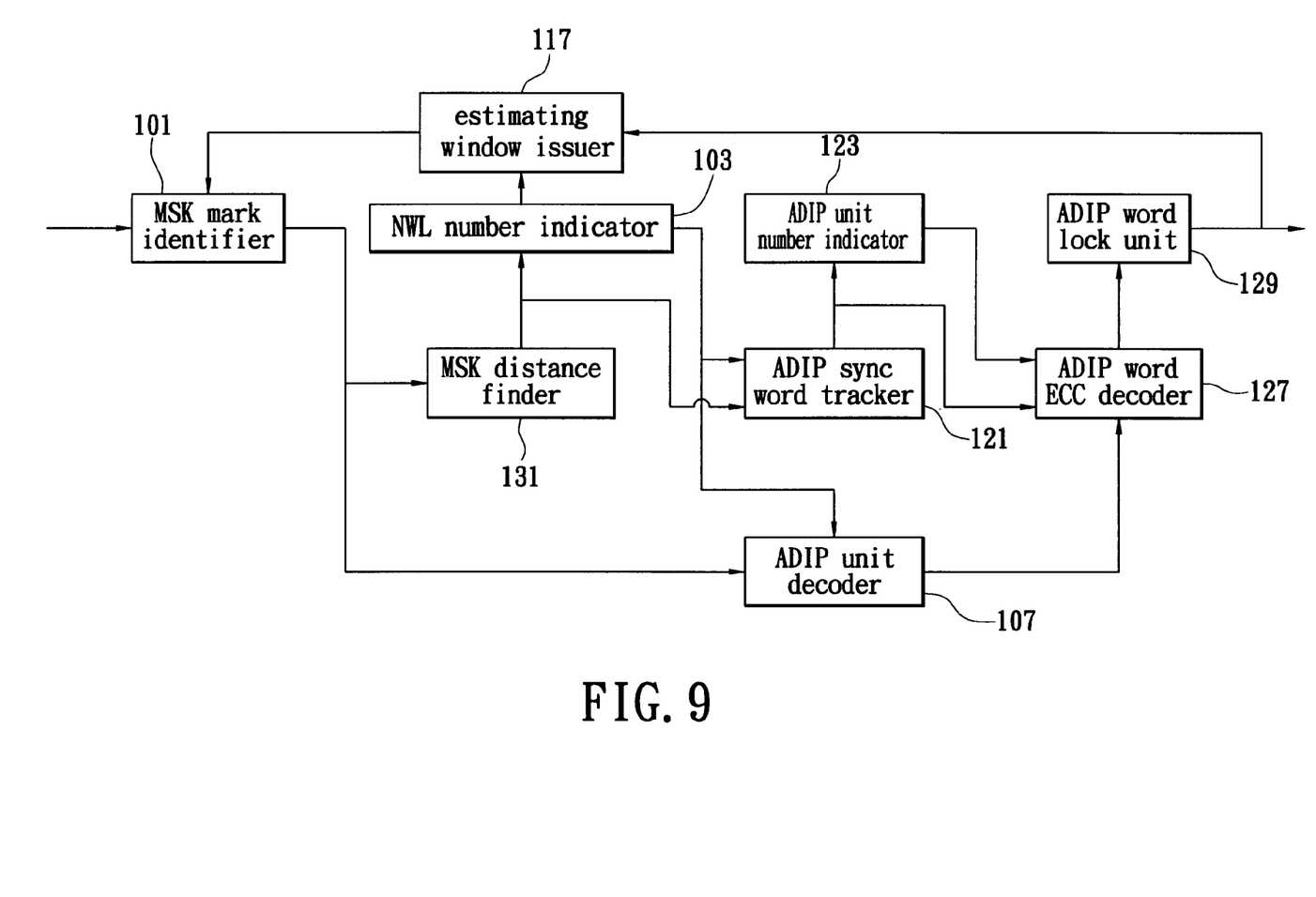
FIG. 9 is a block diagram of the sixth preferred embodiment in accordance with the present invention.

Reference is made to FIG. 9, which is a block diagram of the sixth preferred embodiment in accordance with the present invention. As shown in the figure, some components of the sixth embodiment are the same as that of the fifth embodiment, which include the MSK mark identifier 101, the NWL number indicator 103, the MSK distance finder 131, the ADIP unit decoder 107, the estimating window issuer 117, the ADIP sync word tracker 121 and the ADIP unit number indicator 123.

The difference between the fifth and sixth embodiments is that the sixth embodiment doesn't have the ADIP lock unit 125 but further has the ADIP word error correction code (ECC) decoder 127 and the ADIP word lock unit 129. The ADIP word ECC decoder 127 is used to decode ADIP words. After successfully decoding an ADIP word, the ADIP word ECC decoder 127 sends a success flag signal to the ADIP word lock unit 129. Additionally, the ADIP word lock unit 129 is used to declare an ADIP word lock status according to the success flag signal.

Figure 10:
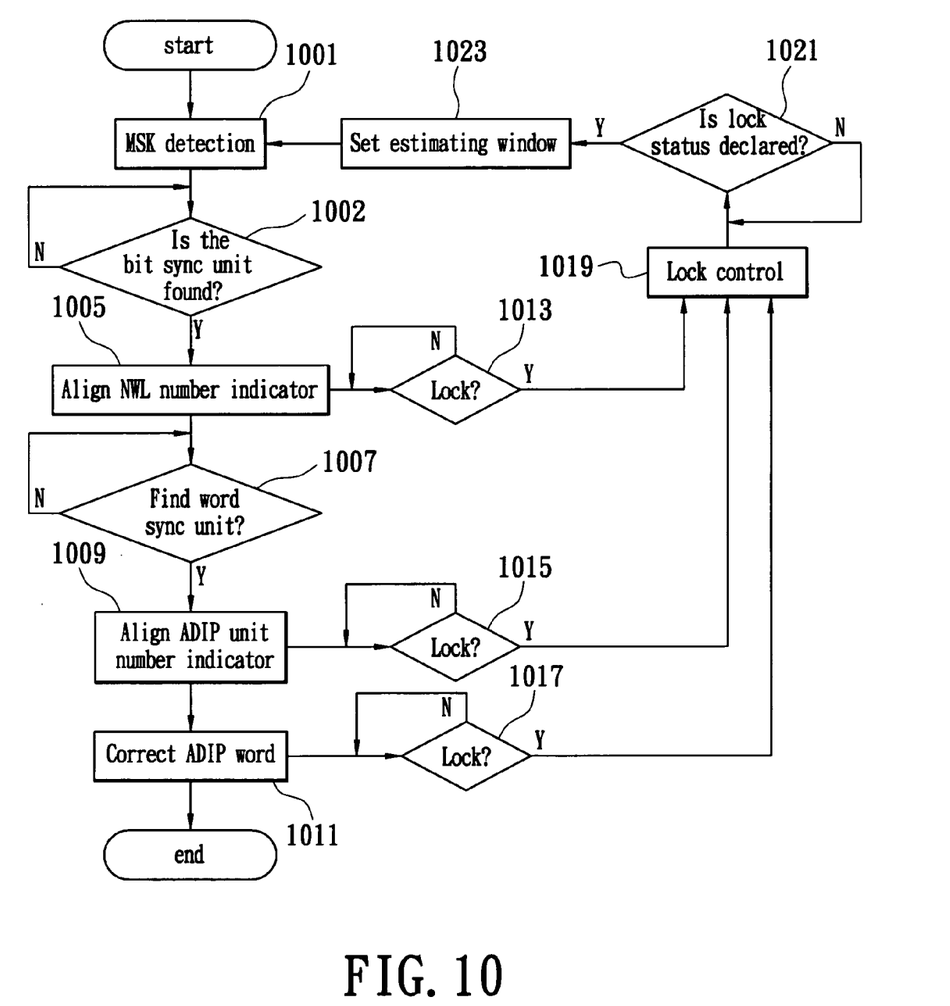
FIG. 10 is an operation flowchart of the ADIP identification apparatus in accordance with the present invention.

Reference is made to FIG. 10, which is an operation flowchart of the ADIP identification apparatus in accordance with the present invention. As shown in the figure, the operations of the present invention includes the following steps:

Step 1001: First, the ADIP identification apparatus of the present invention uses an MSK mark identifier to detect the MSK marks of the ADIP units in the data stream accessed from the optical disc. Each time an MSK mark is detected, the MSK mark identifier outputs an MSK indication signal.

Step 1002: Then, the ADIP identification apparatus uses an MSK position statistic analyzer or an MSK distance finder to find the position of the bit sync units of the ADIP units. If the position of the bit sync units is found, the MSK position statistic analyzer or MSK distance finder outputs an NWL sync signal. Otherwise, the MSK position statistic analyzer or MSK distance finder keeps running this step.

Step 1005: After the position of the bit sync units is found, the ADIP identification apparatus uses an NWL number indicator to receive the NWL sync signal and performs a position synchronization process for position alignment. After that, the NWL number indicator designates the following detected MSK marks according to the synchronization result.

Step 1007: At this moment, the ADIP identification apparatus uses an ADIP sync word tracker to track word sync units and output ADIP unit synchronization signals accordingly. The ADIP sync word tracker tracks the word sync units according to the MSK position information provided by the NWL number indicator and the NWL sync signal sent from the MSK position statistic analyzer or the MSK distance finder. After the position of the word sync units is found, the process continues to the next step. Otherwise, the process keeps running this step.

Step 1009: After the position of the word sync units is found, the ADIP identification apparatus uses an ADIP unit number indicator to receive the ADIP unit synchronization signal and performs an ADIP unit synchronization process for position alignment. The ADIP unit number indicator can designate the positions of the ADIP units according to the synchronization result.

Step 1011: At this moment, the ADIP identification apparatus uses an ADIP word ECC decoder to correct the data inside the ADIP words by decoding. If the decoding is successful, a success flag signal is sent out.

Step 1013: After the position alignment of the NWL number indicator is performed, the ADIP identification apparatus uses an NWL lock unit to declare an NWL lock status according to the position designations of the MSK marks provided by the NWL number indicator and the NWL sync signal sent from the MSK position statistic analyzer or MSK distance finder. In other words, after the NWL sync signal is received, the NWL lock unit compares it with the position designations of the MSK marks provided by the NWL number indicator. If they match, the NWL lock unit declares an NWL lock status. Otherwise, the NWL lock unit declares an NWL unlock status. If the NWL lock status is declared, the process continues to step 1019; otherwise, the process keeps running this step.

Step 1015: After the position alignment of the ADIP unit number indicator is performed, the ADIP identification apparatus uses an ADIP lock unit to declare an ADIP unit lock status according to the position information of the ADIP units sent from the ADIP unit number indicator and the ADIP unit synchronization signal. If the ADIP unit lock status is declared, the process continues to step 1019; otherwise, the process keeps running this step.

Step 1017: After the ADIP word is decoded successfully, the ADIP identification apparatus uses an ADIP word lock unit to declare an ADIP word lock status according to the success flag signal. If the ADIP word lock status is declared, the process continues to step 1019; otherwise, the process keeps running this step.

Step 1019: Since the present invention has the NWL lock unit, the ADIP lock unit and the ADIP word lock unit for declaration of the lock status, a user can choose one of them to declare the lock status and set the estimating window accordingly. Hence, in this step, the ADIP identification apparatus of the present invention can control the declaration of the lock status according to user's setting and the results of step 1013, 1015 and 1017.

Step 1021: In this step, the ADIP identification apparatus determines the lock status according to user's setting. If the user chose the NWL lock unit for lock status declaration, the ADIP identification apparatus determines the lock status according to the result of step 1013; if both the NWL lock unit and ADIP lock unit are chosen, the ADIP identification apparatus determines the lock status according to the results of step 1013 and 1015; and if all of the NWL lock unit, the ADIP lock unit and the ADIP word lock unit are chosen, the ADIP identification apparatus determines the lock status according to the results of step 1013, 1015 and 1017. If the lock status is held, the process continues to step 1023; otherwise, the process keeps running this step.

Step 1023: In this step, the ADIP identification apparatus sets the estimating window according to the result of step 1021. The ADIP identification apparatus uses an estimating window issuer to set the estimating window according to the declarations of the NWL lock unit, the ADIP lock unit and the ADIP word lock unit and the designations of the MSK marks provided by the NWL number indicator.

By using the position information provided by the NWL number indicator, the estimating window issuer can know that the MSK marks have odd or even designation numbers. Since all the designation numbers for the MSK marks must be odd or even at the same time, the system of the present invention can determine that the following MSK marks must appear at the position with odd or even designation numbers after the lock status is held.

Therefore, when the lock status is held, the estimating window issuer can set an estimating window to make the MSK mark identifier only detect the positions with odd or even designation numbers according to the position information provided by the NWL number indicator. The error probability for MSK detection can be further reduced.

Figure 11:
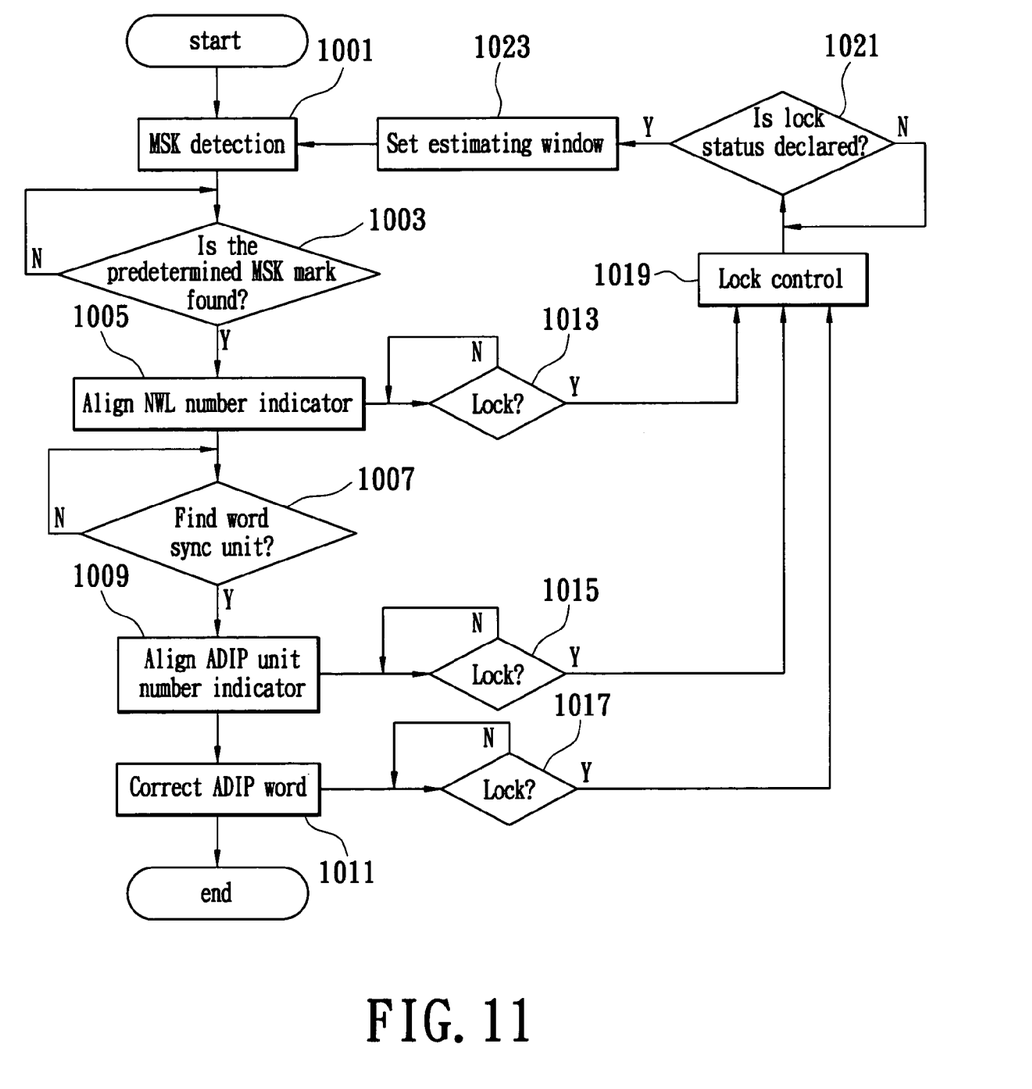
FIG. 11 is another operation flowchart of the ADIP identification apparatus in accordance with the present invention.

Reference is made to FIG. 11, which is another operation flowchart of the ADIP identification apparatus in accordance with the present invention. As shown in the figure, the operation step in FIG. 11 is similar to that in FIG. 10. The difference is that the operation illustrated in FIG. 11 replaces step 1002 with step 1003, described here:

Step 1003: The ADIP identification apparatus uses an MSK position statistic analyzer or an MSK distance finder to find a position of a predetermined MSK mark of the ADIP units. If the position of the predetermined MSK mark is found, output an NWL sync signal accordingly and the process continues to step 1005; otherwise, the process keeps running this step.

As described above, the present invention uses a statistic scheme or a distance-finding scheme to find the position of the first MSK mark, i.e. bit sync unit, or a predetermined MSK mark to identify the ADIP units. The present invention doesn't have the error propagation effect occurring in the prior art so that the error rate for ADIP identification is greatly reduced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. An apparatus for identification of ADIP units, comprising:
   an MSK mark identifier to identify MSK marks of the ADIP units according to an estimation window and output MSK indication signals accordingly;
   an NWL number indicator to designate positions of the MSK marks according to the MSK indication signals and perform a position synchronization process according to an NWL sync signal;

an MSK distance finder to find a predetermined MSK mark according to spacing distances between consecutive MSK marks and output the NWL sync signal accordingly;

an ADIP unit decoder to identify the ADIP units according to the positions of the MSK marks;

an NWL lock unit to declare an NWL lock status according to the positions of the MSK marks designated by the NWL number indicator and the NWL sync signal; and an estimating window issuer to set the estimating window, wherein the ADIP unit decoder identifies the ADIP units according to the positions of the MSK marks after the NWL lock status is declared.

2. An apparatus for identification of ADIP units, comprising:

an MSK mark identifier to identify MSK marks of the ADIP units according to an estimation window and output MSK indication signals accordingly;

an NWL number indicator to designate positions of the MSK marks according to the MSK indication signals and perform a position synchronization process according to an NWL sync signal;

an MSK distance finder to find a predetermined MSK mark according to spacing distances between consecutive MSK marks and output the NWL sync signal accordingly;

an ADIP unit decoder to identify the ADIP units according to the positions of the MSK marks;

an ADIP sync word tracker to track a word sync unit and output an ADIP unit synchronization signal;

an ADIP unit number indicator to designate positions of the ADIP units in a ADIP word and perform an ADIP unit synchronization process according to the ADIP unit synchronization signal;

an ADIP lock unit to declare an ADIP unit lock status according to positions of the ADIP units designated by the ADIP unit number indicator and the ADIP unit synchronization signal; and an estimating window issuer to set the estimating window, wherein the ADIP unit decoder identifies the ADIP units according to the positions of the MSK marks after the ADIP unit lock status is declared.

3. An apparatus for identification of ADIP units, comprising:

an MSK mark identifier to identify MSK marks of the ADIP units according to an estimation window and output MSK indication signals accordingly;

an NWL number indicator to designate positions of the MSK marks according to the MSK indication signals and perform a position synchronization process according to an NWL sync signal;

an MSK distance finder to find a predetermined MSK mark according to spacing distances between consecutive MSK marks and output the NWL sync signal accordingly;

an ADIP unit decoder to identify the ADIP units according to the positions of the MSK marks;

an ADIP sync word tracker to track a word sync unit and output an ADIP unit synchronization signal;

an ADIP unit number indicator to designate positions of the ADIP units in a ADIP word and perform an ADIP unit synchronization process according to the ADIP unit synchronization signal;

an ADIP word ECC decoder to decode a ADIP word having the ADIP units and output a success flag signal after successful decoding;

an ADIP word lock unit to declare an ADIP word lock status according to the success flag signal; and an estimating window issuer to set the estimating window.

4. The apparatus as claimed in claim 1, wherein after the NWL lock status is declared, the estimating window is set to include positions of NWL units with odd or even designation numbers only.

5. The apparatus as claimed in claim 1, further comprising:

an ADIP sync word tracker to track a word sync unit and output an ADIP unit synchronization signal;

an ADIP unit number indicator to designate positions of the ADIP units in a ADIP word and perform an ADIP unit synchronization process according to the ADIP unit synchronization signal; and an ADIP lock unit to declare an ADIP unit lock status according to positions of the ADIP units designated by the ADIP unit number indicator and the ADIP unit synchronization signal, wherein after the NWL lock status is declared, the estimating window is set to include positions of NWL units with odd or even designation numbers only;

wherein the ADIP unit decoder identifies the ADIP units according to the positions of the MSK marks further after the ADIP unit lock status is declared.

6. The apparatus as claimed in claim 1, further comprising:

an ADIP sync word tracker to track a word sync unit and output an ADIP unit synchronization signal;

an ADIP unit number indicator to designate positions of the ADIP units in a ADIP word and perform an ADIP unit synchronization process according to the ADIP unit synchronization signal;

an ADIP word ECC decoder to decode a ADIP word having the ADIP units and output a success flag signal after successful decoding; and an ADIP word lock unit to declare an ADIP word lock status according to the success flag signal, wherein after the NWL lock status is declared, the estimating window is set to include positions of NWL units with odd or even designation numbers only.

* * * * *

UNITED STATES PATENT AND TRADEMARK OFFICE
CERTIFICATE OF CORRECTION

PATENT NO. : 7,623,424 B2  Page 1 of 1
APPLICATION NO. : 11/042082
DATED : November 24, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Twenty-sixth Day of October, 2010

David J. Kappos
*Director of the United States Patent and Trademark Office*